Sept. 23, 1969 A. L. NASVYTIS 3,468,192
TRANSMISSION
Filed Oct. 3, 1966 5 Sheets-Sheet 1

INVENTOR.
Algirdas L. Nasvytis

BY Hill, Sherman, Meroni, Gross & Simpson
ATTORNEYS Sept. 23, 1969  A. L. NASVYTIS  3,468,192

TRANSMISSION

Filed Oct. 3, 1966  5 Sheets-Sheet 3

INVENTOR.
Algirdas L. Nasvytis

BY  ATTORNEYS

Sept. 23, 1969         A. L. NASVYTIS         3,468,192
                         TRANSMISSION
Filed Oct. 3, 1966                      5 Sheets-Sheet 5

INVENTOR
Algirdas L. Nasvytis

BY                                      ATTORNEYS

United States Patent Office 3,468,192
Patented Sept. 23, 1969

3,468,192
TRANSMISSION
Algirdas L. Nasvytis, 10823 Magnolia Drive,
Cleveland, Ohio 44106
Filed Oct. 3, 1966, Ser. No. 583,830
Int. Cl. F16h 37/06, 57/10
U.S. Cl. 74—682                                    28 Claims

ABSTRACT OF THE DISCLOSURE

A shiftable planetary transmission providing a plurality of power paths selectively shiftable during a stationary condition, and incorporating means for rendering, selectively, one of the power paths stationary for shifting purposes.

---

As those skilled in the art of transmission are aware, it is extremely desirable to provide a change-speed system having a wide variety of speeds. Such systems have existed in the past. However, a common deficiency of prior art systems has comprised an inability to vary the gear ratio without at the same time disconnecting the drive for purposes of shifting mechanical gears or the like. Heretofore, transmission systems capable of a ratio change during the transmission of torque have incorporated hydraulic torque converter devices or the like having extremely low efficiency, high complexity and high cost. Although development work done in the field of automatic transmissions incorporating hydraulic converter devices has progressed very rapidly and improvements have been made in their performance, nevertheless the fact remains that such systems are commercially used almost exclusively in transmission systems where economy of operation is not a factor, such as for example in relatively high cost automotive vehicles. Commercial systems requiring the transfer of high torques have employed, for the most part, conventional mechanical change speed transmissions in which relatively limited ratio changes are provided and wherein the transmission has required separation of the drive line during shifting operations.

The present invention eliminates the low efficiency inherent in the hydraulic systems heretofore used and, instead, provides smooth high efficiency mechanical transmission shiftable through a wide range of ratio changes while under full load, torque-transmitting operation. Additionally, in accordance with the present invention, an extremely efficient transmission system is constructed of a minimal number of parts and has, in its preferred form, similar input and output planetary gear systems.

In accordance with the principles of the present invention, two power paths are provided between an input shaft and an output shaft. Preferably, each of the paths is provided with several change speed mechanisms and the power paths are comprised of planetary gear systems in constant mesh. Through the selective operation of control means, one of the parallel paths may be shifted to provide a change in ratio therein while the other path is transferring torque through the system. By sequentially shifting from power path to power path and the shifting of gears in the stationary power path, a variable ratio transmission is provided capable of providing a continuous torque transmission. Since shifting is readily accomplished in one path while the other is transmitting torque, the shaft may be accomplished while the shifted parts are rotationally motionless thereby eliminating expensive synchronizing mechanisms. Further, by providing for simultaneous engagement of both branches of the power paths intermediate ratios are obtained. While the transmission is readily operable manually it is ideally suited to automatic speed control in small incremental ratio changes by governor and/or throttle action. Similarly, by providing an infinite range of differential action between the two power paths by way of interconnected electrical or hydraulic motor generator units, an infinitely variable transmission continuously variable under full torque and speed conditions is provided.

I have found that in an input and output planetary arrangement in mirror symmetry and two countershafts (one between the carriers and one between the ring gears), the reaction forces on the first planetary rotating members are only a small fraction of the total input forces if two adjacent ratio steps in alternate countershafts are small. For example, if the ratio step is 1.2, the reaction forces on the first planetary are only .2 of the total reaction forces. By making the ratio step smaller, the reaction forces accordingly will become smaller. Therefore, low capacity brakes can be used, the duration of the brake engagement can be extended, or even a hydrostatic or similar unit can be used between the ring gear and the carrier of the first planetary system with the use of only a small fraction of the input power thereby converting the transmission into an infinite variable drive unit. Accordingly, means may readily be provided, as hereinafter more fully set forth, for modifying the ratio and the transfer of power between the plural power paths or branches with the subtraction of a minimal amount of power. I have found that complete control of the transmission system may readily be accomplished through the application of a control torque on the order of 5% or less of transmitted torque.

It is, accordingly, an object of the present invention to provide a novel, simple, planetary transmission capable of providing simple change of ratio under full torque and speed.

Another object of the present invention is to provide a planetary system having control means operable to provide infinite ratio change between a minimum and maximum ratio.

A feature of the invention resides in the provision of substantially identical input and output planetary units in which the ring members of the two units and the carrier members of the two units comprise split power transmission paths that first separate and then reunite at the output.

Another feature of the invention is the elimination of hydraulic torque transmitting coupling members while at the same time retaining smooth operation during ratio shifting.

A further object of the invention is to provide a mechanical transmission having an efficiency in excess of 90% while permitting a wide range of ratio change at a fully loaded condition.

Still a further object of the invention is to provide a planetary transmission susceptible of simple, sequential, ratio change in a manner permitting automatic mechanical control.

Still other and further objects of the invention will at once become apparent from a consideration of the attached specification and drawings wherein several preferred embodiments of the invention are shown by way of illustration only, and wherein:

Figure 1:
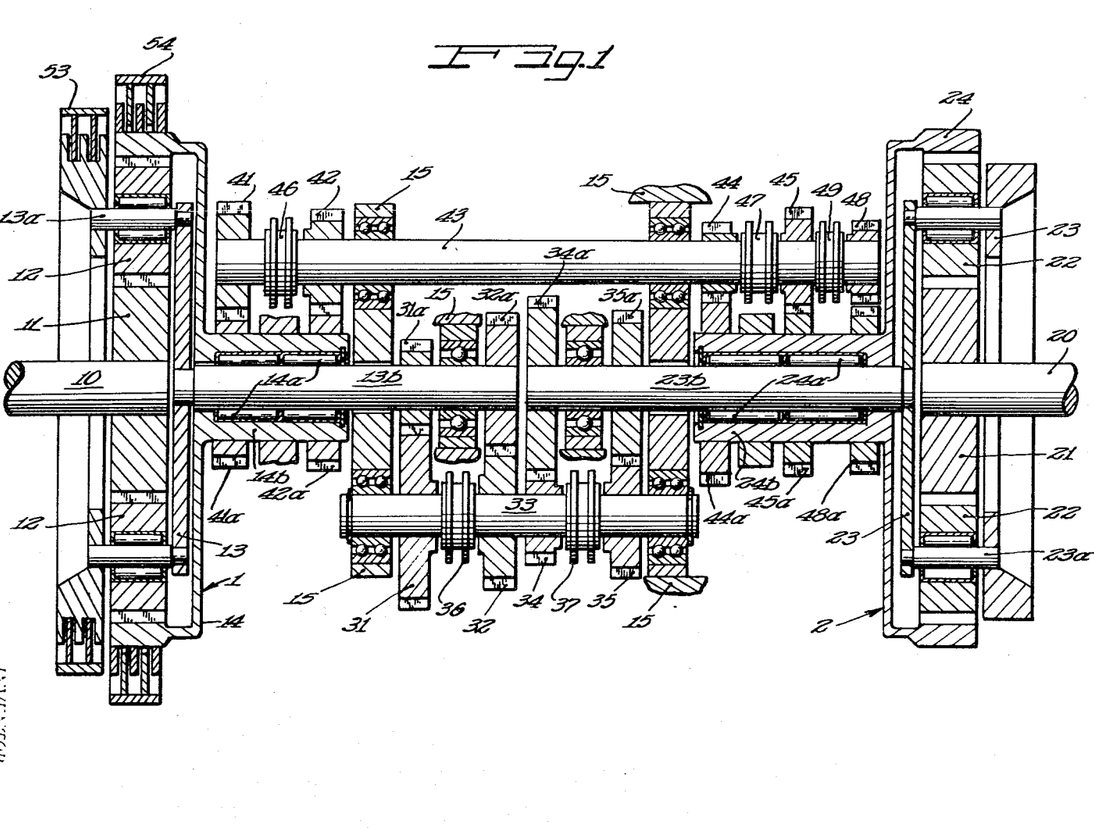
FIGURE 1 is a side-elevational view in cross-section of a basic planetary transmission constructed in accordance with my invention.

As may be seen from a consideration of FIGURE 1, the transmission of the present invention, in its basic form, comprises a drive input shaft 10 and output shaft 20 which comprise, respectively, the shafts for identical sun members 11 and 21 of input and output planetary systems 1 and 2. Sun gear 11 cooperates with planets 12 rotatably mounted on axes 13a of carrier 13. Planets 12 cooperate with an internal ring gear 14. Carrier 13 is rotatably carried in fixed housing 15 which supports the transmission by way of a conventional outer enclosure element, not shown. Similarly, ring gear 14 is rotatably carried about the planet shaft 13b by means of roller bearings 14a which cooperate with the ring gear sleeve extension shaft 14b.

The basic planetary gear system 2 is preferably identical to system 1, in reverse. Accordingly, the output shaft 20 carries output sun member 21 which cooperates in turn with planets 22 carried by output carrier 23 via axes 23a, supported on output carrier shaft 23b. Similarly, output ring 24 has its extension sleeve shaft 24b supported by bearings 24a running on the shaft 23b rotatably supported in the fixed frame 15.

It will be apparent, accordingly, that I have provided, as thus far described, a planetary transmission which comprises input and output planetary sets which have a mirror image relationship. If, for example, the shafts 23 and 13 were directly connected and shafts 24 and 14 were similarly connected, no ratio change would take place whether or not one or both of the carrier and ring members was fixed or restrained.

However, in accordance with the present invention, a wide range of ratio changes is accomplished by providing two counter shafts 33 and 43 which operate to provide a ratio change respectively, between shafts 13, 23 and shaft 14, 24. This may readily be seen from FIGURE 1 where shaft 33 is rotatably mounted in a fixed frame 15 and carries, rotatably mounted thereon, four gears 31, 32, 34, 35. Shift collars 36, 37 are splined to the shaft 33 for rotation therewith and when moved axially on a selective basis, cause the engaged gear to rotate with the shaft 33. As shown, gears 31 and 32 cooperate, respectively, with gears 31a and 32a fixedly carried by shaft 13b for rotation therewith. Gears 31a and 32a are in constant mesh with their respective gears 31 and 32. Similarly, output gears 34a and 35a are rigidly secured for rotation with shaft 23b and are in constant mesh with their co-operative gears 34 and 35. With this arrangement it will be observed that four different ratios may be provided between carrier 13 and carrier 23 by shifting the clutch yokes or collars 36, 37.

In the same manner as described with respect to the carrier 13, 23, the ring members 14, 24 are interconnected by way of countershaft 43 through four possible gear ratios. These are provided by the countershaft gears 41, 42, 44, 45, which co-operate, respectively, with 41a, 42a, 44a and 45a rigidly secured to the respective input and output sun shafts 14a, 24a. The ratio changes are made by axially shifting yokes 46, 47 which are splined on countershaft 43 for rotation therewith. A reverse gear is provided by gear 48 carried by countershaft 43, which gear has an idler gear in contact therewith and in contact with reverse gear 48a carried by shaft extension 24b.

Shifting the transmission is accomplished by shifting yokes 36, 37, 46, 47 and 49 and by braking the rotation of the carrier 13 and/or ring member 14. The latter braking operation is accomplished by means of respective brakes 53, 54 diagrammatically illustrated as multiple disc brakes and energizable in any conventional manner. For example, the brakes 53 and 54 may be energized by means of a hydraulic piston or electrical solenoids, and similarly, the shift yokes or collars 36, 37, 46, 47 and 49 may be axially shifted by means of such devices energized by manual valve or switch means energizable separately or in combination in accordance with the chart below:

TRANSMISSION GEARING COMBINATIONS

| Speed No. | R | 0 | 1 | 2 | 3 | 4 | 5 | 6 | 7 | 8 |
|---|---|---|---|---|---|---|---|---|---|---|
| Ring gear brake 54 | 0 | 0 | + | 0 | + | 0 | + | 0 | + | 0 |
| Carrier countershaft combination. | 31 34 | 31 34 | 31 34 | 31 35 | 31 35 | 32 34 | 32 34 | 32 35 | 32 35 | 32 35 |
| Ring gear countershaft combination. | 48 42 | 48 42 | 42 44 | 42 44 | 42 45 | 42 45 | 41 44 | 41 44 | 41 45 | 41 45 |
| Carrier brake 53 | + | 0 | 0 | + | 0 | + | 0 | + | 0 | + |

0=Released; +=engaged.

→ VEHICLE ACCELERATING

A consideration of the charted values above set forth, together with the structure illustrated in FIGURE 1, clearly shows the manner of operation. For example, the transmission may be placed in the neutral condition by release of both the brakes 53 and 54 and the positioning of the carrier counter shaft clutches 36, 37 to provide drive through gear combination 31, 34, and movement of the ring gear countershaft clutches 46, 47, 49 to provide drive through gears 42, 48. In this condition, with both brakes released, the transmission is in neutral. Engagement of the carrier brake 53 will provide reverse drive at a ratio equal to the highest forward ratio, in reverse, and, alternatively, engagement of the ring gear brake 54 will provide a first low speed, high ratio forward output. During this first speed condition, in which the ring gear brake 54 is engaged, the ring gear countershaft 43 is nonrotational and may be shifted to the position needed for the next higher, forward speed ratio, namely, the condition in which gears 42 and 44 provide the drive. This shifting is accomplished while shaft 43 is fixed and hence no synchro mesh devices of any sort are required. Further, in view of the fact that the shaft 43 is fixed against rotation, the drive is completely through the carrier countershaft 33, and the shifting is accomplished during the period in which the transmission is at full load. The next speed forward, namely, speed 2 is accomplished by engagement of the carrier brake 53 in which event the drive is solely through the ring gear countershaft gears 42, 44 while the gears 31, 34 are fixed and may be shifted to the next position in which gears 31, 35 provide the drive. Application of the ring gear brake 54 will stop rotation of the ring countershaft 43 permitting changing of the ring countershaft gears to the combination of gears 42, 45, while the power is transmitted through gears 31, 35 of the carrier countershaft. The next lower ratio of speed 4 is provided by engagement of the carrier brake 53 locking carrier countershaft 33 to permit shifting of the gears thereon to the gear combination 32, 34 while power is being completely transmitted through the ring gear countershaft. The next forward speed 5 is obtained by energization of the ring gear brake 54 which locks ring gear countershaft 43 to permit change of the gears thereon to the combination 41, 44 while power is transmitted through the carrier countershaft combination gears 32, 34. The subsequent ratio 6 is achieved by energization of the carrier brake 53 at which time the carrier shaft 33 is locked permitting shift of the gears to the combination 32, 35 while full power is being transferred via the ring gear countershaft combination 41, 44. The speed 7 is achieved by the application of the ring gear brake 54 locking the countershaft 43 to permit change to the ring gear countershaft combination 41, 45 while power is transmitted through the carrier countershaft combination 32, 35. The highest speed 8, namely the most direct drive, lowest ratio condition, is achieved by the application of the carrier brake 53 fixing rotation of the carrier countershaft 33 while power is transmitted through the combination 41, 45 on the ring gear countershaft 43. Upon down gearing the transmission, the carrier brake 53 is deenergized and ring gear brake 54 is energized fixing the ring brake countershaft 43 and permitting shifting of the gears thereon to the combination 41, 44 during transmission of power through the carrier countershaft gears 32, 35. The next down shifted position 6 is achieved by application of carrier brake 53 freezing the carrier countershaft 33 to permit shifting of the gears thereon to the combination 32, 34, and so forth.

It will be observed from the above discussion, that a continuous shifting program is possible without ever providing for a requirement wherein shifting gears must be accomplished while the gears are in motion. In every case, the gears may readily be shifted after the application of the brake controlling the gears and, accordingly, extremely simple gear clutching arrangements, well known in the art, may be employed. At the same time that the transmission is capable of being shifted from one speed to the next under full load, it will be observed that no rapid shifting movements are necessary. The release of brakes, or the engagement thereof, may be accomplished gradually since no rapid clutchings are required during such movement. Further, during the shifting of the transmission from the highest to the lowest ratio, the transmission is never actually disengaged and no parts of the transmission must be coupled through a coupling, such as for example, a fluid coupling, ordinarily considered necessary to accommodate variations in rotational speed between coupled parts. As a result of this arrangement, fluid couplings, which are ordinarily relatively inefficient, may be eliminated from the transmission entirely. It will be understood, however, that, if desired, a fluid coupling or clutch may be provided at the input shaft 10 to minimize pulses through the system upon down or up shifting gears directly through a number of ratio changes, such as for example, from speed 8 to speed 3 or from speed 2 to speed 7 against a drive motor of a relatively constant speed.

It will be apparent to those skilled in the art that the actual gear ratios employed on the countershafts and planetary units may be modified without changing the operation of the system materially. A wider range of shifts may be provided by the addition of additional gear pairs on one or both of the countershafts and, similarly, the number of shifts provided may be reduced by elimination of one or both of the gear pairs from one or both of the countershafts. For example, a simple three-speed forward and one-speed reverse transmission constructed in accordance with the present invention may be provided by having the ring gear of the input planetary connected to the ring gear of the output planetary by way of a single gear shiftable to forward or reverse through an idler gear and a connection from the carrier of the input planetary to the carrier of the output planetary via a single unshiftable gear reduction pair. With such an arrangement, neutral is provided with neither the carrier nor the ring of the input planetary unit braked and with the reverse gear engaged, the reverse gear providing the same ratio as the first forward gearing ratio. With the parts thus constructed, neutral will provide no output. Reverse drive is accomplished by engagement of the planetary carrier brake with resulting stoppage of the transfer of power through the carrier reduction unit and the transfer of power solely through the reverse gear in the ring gear reduction unit. Deenergization of the carrier brake will return the transmission to neutral and subsequent energization of the ring gear brake will provide initial forward speed ratio through the carrier gear reducing combination. During operation of the transmission in this first speed forward, the ring gear reduction pair is shifted from the reverse unit to the forward speed unit and the second speed forward is achieved. Second speed forward is accomplished, then, by energization of the carrier brake with power being transferred at that time by way of the forward speed gear reduction pair between the input ring and the output ring. As in the case of the transmission above described having eight forward speeds, the two-speed transmission is readily shiftable under full power and at full speed, and provides an extremely simple transmission system.

In the gearing example illustrated in FIGURE 1, I have found a very satisfactory system of ratios to provide a first ratio, in the carrier, of 4; 2.56; 1.638; and 1.084 with a set of ring ratios as minus 4 (reverse) 3.2; 2.048; 1.321; and .8384. The step down between ratios on opposite countershafts is 20% in the ratio decreasing direction (i.e., 3.2/4=.8 or 20% reduction in ratio) and between ratios on the same countershaft the step down is two drops of 20% (i.e., 2.048/3.2=.64 or 36%). This provides identical ratio drop throughout the shift range.

Figure 3:
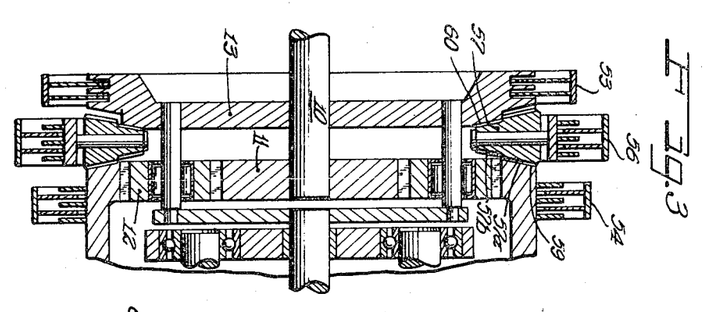
FIGURE 3 is a partial side-elevational view diagrammatically illustrating a revised control system applicable to the transmission shown in FIGURES 1 and 2.

A fifteen speed transmission may readily be constructed by modifying the structure of FIGURE 1 by providing a differential unit between the carrier and the ring and providing a third brake. Such an arrangement is shown in FIGURE 3. There, corresponding parts are identified with the same numerals as shown in FIGURE 1 and, additionally, brake 55 is provided on a differential ring 56 carrying bevel gears 57. The ring 56 comprises an annular ring and the bevel gears 57 are carried about radial axes 58. The gears 57 carry toothed portions 57a in cooperation with toothed portions 59 on the ring gear 14 and toothed portions 57b in contact with toothed portions 60 on carrier 13. By providing a ratio between portion 57a and 57b equal to the speed ratios between the ring 14 and carrier 13, an equal balance between the carrier and the ring is provided. Energization of the brake 55 will cause the annular ring 56 to stop which will, accordingly, lock the entire device if either brake 53 or 54 is energized and which will force ring 14 and carrier 13 to rotate in opposite directions at an intermediate ratio if both the brakes 53 and 54 are deenergized. The operation of the transmission modification shown in FIGURE 3 is essentially the same in all other respects as the transmission shown in FIGURE 1, and would provide the same gear relationships as shown in the specification above except that intermediate speeds are provided between each of the forward speeds when the brake 55 is engaged. In the event of utilization of the brake 55, it will be understood that it must be released immediately prior to energization of either the carrier or ring brakes during a sequence of shifting in order to prevent locking the transmission. The following chart embodies this variation:

TRANSMISSION GEARING COMBINATIONS

| Speed No. | R | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| Ring gear brake 54 | 0 | 0 | + | 0 | 0 | 0 | + | 0 | 0 | 0 | + | 0 | 0 | 0 | + | 0 | 0 |
| Carrier countershaft combination. | {31 | 31 | 31 | 31 | 31 | 31 | 31 | 31 | 32 | 32 | 32 | 32 | 32 | 32 | 32 | 32 | 32 |
|  | {34 | 34 | 34 | 34 | 35 | 35 | 35 | 35 | 34 | 34 | 35 | 34 | 35 | 35 | 35 | 35 | 35 |
| Ring gear countershaft combination. | {48 | 48 | 42 | 42 | 42 | 42 | 42 | 42 | 42 | 42 | 41 | 41 | 41 | 41 | 41 | 41 | 41 |
|  | {42 | 42 | 44 | 44 | 44 | 44 | 45 | 45 | 45 | 45 | 44 | 44 | 44 | 44 | 45 | 45 | 45 |
| Carrier brake 53 | + | 0 | 0 | 0 | + | 0 | 0 | 0 | + | 0 | 0 | 0 | + | 0 | 0 | 0 | + |
| Differential brake 55 | 0 | 0 | 0 | + | 0 | + | 0 | + | 0 | + | 0 | + | 0 | + | 0 | + | 0 |

0 = Released; + = engaged.

⎯⎯⎯⎯⎯⎯⎯⎯⎯⎯⎯⎯⎯⎯⎯⎯⎯⎯⎯⎯→
VEHICLE ACCELERATING

Figure 4:
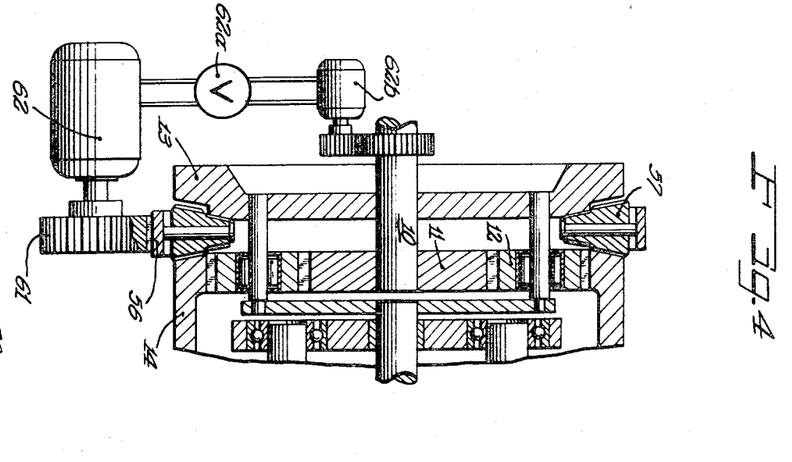
FIGURE 4 is a side-elevational view of a still further revised form of planetary control system applicable to the transmission system shown in FIGURE 1.

I have found from a consideration of the dynamics involved, that a further simplification may be provided where it is considered desirable to provide a substantially infinite ratio between gear changes. Such a system may be accomplished by the elimination of all brakes 53, 54 and 55 and the replacement, in a system such as shown in FIGURE 3, of the carrier and ring brakes by variable hydraulic motor 62. Such an arrangement is illustrated in FIGURE 4 where pump 62 is driven by pump 62b and is directly connected to the ring 56 by drive gear 61 cooperating with gear 56a on ring 56. Such an arrangement will provide an infinite ratio change through the intermediate range between conditions in which the drive is solely through one countershaft, with the outer countershaft stationary and vice-versa. In operation, if the motor 62 is stopped against rotation the ring 56 is immobile and the middle speed between the carrier and ring is provided in the same way as provided by the brake 55 in the embodiment in FIGURE 3. However, if the variable speed motor 62 is rotated to force the ring 56 to rotate in the direction in which the ring gear is rotating, the carrier will stop rotation when the ring 56 reaches one-half the speed of rotation of the ring gear. At this moment both the carrier and the carrier countershaft 33 are stopped against rotation and the gear shifts may be made as described in the embodiment of FIGURE 1. If, on the other hand, the variable speed drive 62 decelerates, the total drive ratio will increase or decrease depending upon whether the countershaft was shifted to a higher or lower ratio. The middle ratio is again achieved when the motor 62 is stopped. If the direction of rotation of the motor 62 is reversed, then again upon reaching one-half the speed of the rotating carrier 13, the ring 14 and the ring gear countershaft 43 will be stopped and the ring gear countershaft may conveniently be shifted to a higher or lower ratio. The variable speed motor 62 can be kept rotating at any speed by means of a suitable control, indicated for example as a control valve 62a thereby positively enforcing an infinitely variable ratio between the limit ratios of the transmission operating with either the ring countershaft 43 stationary or the carrier countershaft 33 stationary. In this way, the variable speed drive is able to enforce a gradual change of ratio in the main transmission. By providing continuously increasing shift ratios with change from ring to carrier and back, coupled with the infinite ratio possibilities between each countershaft condition, a smooth infinitely variable ratio transmission is provided between the highest ratio #1 speed and the lowest ratio #15 speed, for example. The ratio limits are, as can be seen, not a function of the variable speed motor 62 but merely the high and low ratio gear combinations. It will be noted that the motor 62 may be non-variable if the pump 62b is variable and reversible.

Control of the infinitely variable embodiment of the transmission described in FIGURE 4 is accomplished by the addition of very minimal amounts of power to the ring 56. When the variable speed drive 62 is stationary, the sum of the reaction forces on the ring 56 equals zero. To initiate movement of the ring 56 in one direction or another requires very little power. The maximum power required at the variable speed drive 62 is applied under maximum speed conditions when either the ring gear 14 or the carrier 13 is stopped. At this point, it has been found that the total power required in the variable speed drive is a very small fraction of the power being transmitted through the transmission. In fact, the reaction force on the carrier 13 and the ring 14 is equal to the ratio step between two adjacent ratios on the two countershafts, minus one. This ratio step can be selected to comprise a very small increment, for example on the order of 1.1 or 1.05 in the direction of ratio increase. In the case in which .05 is employed, the available speed drive can control the infinite ratios in the main transmission upon the application of only 5% of full transmission power. Manifestly, lower power requirements may be provided by increasing the number of shifts necessary on the countershaft, thereby decreasing the step between shifts and rendering the above-mentioned increment smaller.

In the system shown in FIGURE 4 employing the variable speed motor 62 during movement from a minus maximum to a plus maximum of motor rotational speed, one-half of the cycle will comprise a power input to the main transmission and one-half of the cycle will comprise a power subtraction therefrom. Ordinarily, the input power to the variable speed motor 62 will be taken from the main input shaft by means of the pump 62b for example, and, accordingly, power will not be consumed except for losses in the variable speed drive. By utilizing the system of the present invention, losses ordinarily occasioned by the use of variable speed drives, are substantially eliminated and the efficiency of the basic main transmission which comprises a mechanical system, is on the order in excess of 94%. This is compared with most previously known hydrostatic variable speed drives having an efficiency within the range of 65% to 75%.

Figure 2:
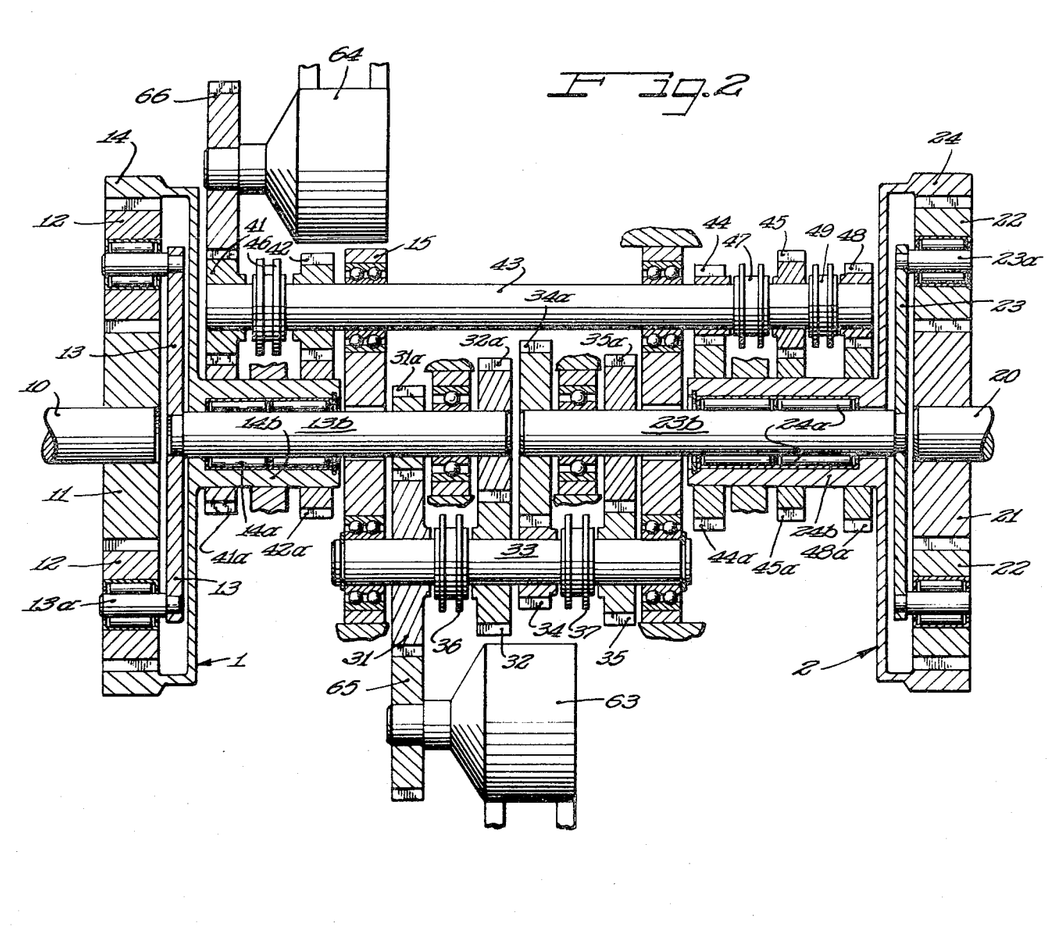
FIGURE 2 is a side-elevational view in cross-section of a modified form of transmission in accordance with the invention.

As above noted in connection with the construction shown in FIGURE 4, the power required to move the ring 56, which power is supplied by variable motor 62, is very small. It has been observed that at any selected set of ratios, the larger the unbalanced forces are, the slower the branch will rotate and that the unbalanced power (the unbalanced force times the r.p.m.) is equal in both branches of the transmission at any selected gear combination in both branches. Therefore, it is possible to balance the drive by employing a hydraulic transfer unit consisting of two variable displacement pumps or motors, one driving the ring 14 and the other driving the carrier 13. By connecting the two variable motors in series circuit with each other, equal power flow between the ring countershaft and carrier countershaft power paths will provide equal liquid flow between the motors. As noted above, investigation has shown that the maximum unbalanced force between the two power branches is equal to the ratio of the two adjacent reduction ratios, on opposite countershafts, minus 1, and that if the selected steps of the ratio, in the increasing direction, comprise 1.2, the maximum unbalanced power that must be taken from one branch and transmitted to the other is approximately one-fourth of the maximum unbalanced force value or is approximately 5% in the given example. In this system it is possible to control the differences of rotation speed in both branches with very little power necessary at the controlling element. Such an arrangement is illustrated in FIGURE 2 where motor-pump 64 is drivingly connected to the ring 14 by way of gear 66 and motor-pump 63 is drivingly connected to the carrier 13 by way of gear 65. Gears 65 and 66 are computed to provide equal pump displacement when the speeds of the ring and carrier are equal and opposite or, in other words, at the midpoint balanced condition of drive between end point conditions in which one or the other of the countershafts 33, 43, is fixed against rotation. Under such circumstances no power is transmitted between the two power paths. Control of the drive is then readily accomplished by controlling the displacement of the two pumps simultaneously by adjusting the displacement of one pump to reduce the output per revolution, and simultaneously adjusting the output of the other pump to increase its output per revolution. The revolutions of their respective planetary gear elements will then be forced to change to provide equal flow through both motor-pumps. Accordingly, the relative speeds of the ring and the carrier may be maintained at values different from the value of equal and opposite obtained at the midpoint condition. As the pump 64 approaches zero displacement in adjustment and the pump 63 simultaneously approaches maximum displacement, the carrier 13 will approach to a relatively stopped condition in which shifting of the carrier countershaft gears 31, 32, 34, 35 may readily be accomplished and, similarly, as the pump 63 approaches a minimum displacement and pump 64 approaches maximum displacement, the ring gear 14 approaches a stopped condition in which the ring gear countershaft 43 is stopped and gears 41, 42, that in the case of a transmission in which the ratio in the increasing direction between countershafts is 1.2, the power required by the pumps is again a maximum of less than 5% of the total power transmitted through the drive and hence the control function provided by the two series connected pumps is accomplished with minimal inefficiency in the over-all transmission. In the selection of transfer pumps it may be noted that since ordinarily the pumps have a maximum power requirement of only 5%, a very low power requirement is imposed on the transfer units and it is possible to employ inexpensive variable speed pump-motor combinations.

By appropriate application of speed reduction gearing, standard gear pump devices may be employed to provide change in relative carrier and ring rotation. Such an arrangement is shown, for example, in FIGURE 5 where three gear pumps 70, 71 and 72 are provided in a system of the type not employing differentials, such as for example, a transmission of the type shown in FIGURE 2. If the ratio in the ring gear is defined as $C/A$ where C is the radius of the ring gear 14 and A is the radius of the sun gear 11, and, accordingly the ratio of the carrier is $C/A+1$ it can be stated that $$N_{\text{input shaft 10}} = N_{\text{carrier}}\left(\frac{C}{A}+1\right) + N_{\text{ring}}\left(\frac{C}{A}\right)$$

Figure 5:
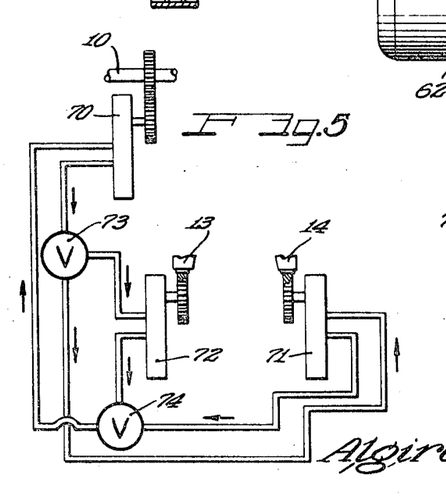
FIGURE 5 is a variation in control mechanism applicable to the construction shown in FIGURE 4; and in diagrammatic form.
Figure 6:
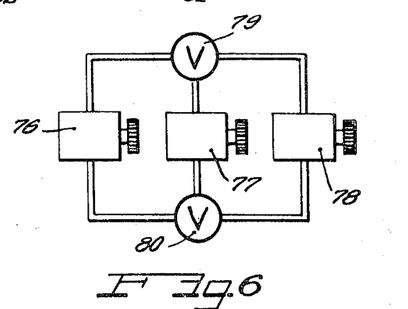
FIGURE 6 is a diagrammatic illustration of a still further control system applicable to the planetary drive illustrated in FIGURE 4.

In view of this relationship three identical gear pumps can be employed; the first, No. 70, driven by the input shaft 10, the second driven by the ring gear 14 with a ratio increase $C/A$ and the third driven by the carrier with a speed increase $(C/A+1)$ coupled in the circuitry as illustrated in FIGURE 6 using conventional two-way valves of conventional construction 73 and 74 which are operated by a single control operating to split the output of the pump 70 to the inputs of the pumps 71 and 72 via valve 73 by an adjustable ratio and simultaneously adjust the returns from pumps 72 and 71 to the inlet pump 71 via valve 74 by the same ratio. This arrangement will require the ring 14 and the carrier 13 to rotate in precise relationship dictated by the valves 73, 74. It may be observed, however, that the power required for control purposes by means of the gear pumps of the construction shown in FIGURE 5 is more than the power required by the dual variable displacement transfer motor-pump employed in FIGURE 2.

Figure 8:
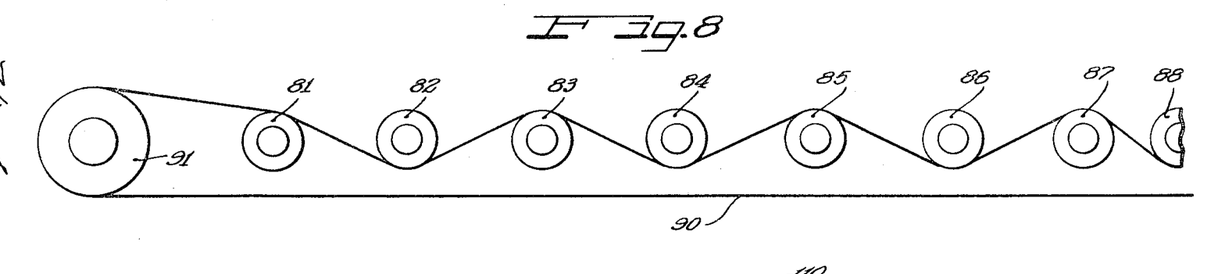
FIGURE 8 is a sectional view taken along line VIII—VIII of FIGURE 7.

Three gear pumps can be utilized to provide the variable control in still a further arrangement shown in FIGURE 6. In this arrangement, a differential type unit is applied similar to the physical components shown in FIGURE 4. Thus, a first pump 76 is driven by the carrier 13 and a second pump 78 is driven by the ring 14. A third pump 77 is driven by the differential ring 56, all in a FIGURE 8 circuit as shown in FIGURE 6 under the control of two three-way valves 79 and 80. In this relationship, it can be stated that $$N_{\text{carrier}} - N_{\text{ring}} = 2N_{\text{differential ring}}$$

and, accordingly, all three pumps can be identical if the differential pump 77 has a two-to-one speed increaser in its drive. The valves 79 and 80 are operable to shut off either pump 76 or 77 or 78 individually, in which event the corresponding ring or carrier part is held stationary while the other two components rotate. By providing each of the valves 79, 80 with gradual closing ports to permit the gradual closing of flow to the individual pumps 76, 77 or 78, the relative rotation between the ring and carrier is accurately controlled to provide an infinite variation in ratio between conditions in which the ring countershaft 43 is fixed and the condition in which the carrier countershaft 33 is fixed. Since, as in all of the cases above described, either the ring countershaft 43 or the carrier countershaft 33 can be held against rotation while the other is transferring power through the transmission, shifting of mechanical gear sets can readily be accomplished during the time when the respective countershaft is thus fixed. As a result, continuously variable ratio change may be accomplished over a wide range of ratios.

Figure 7:
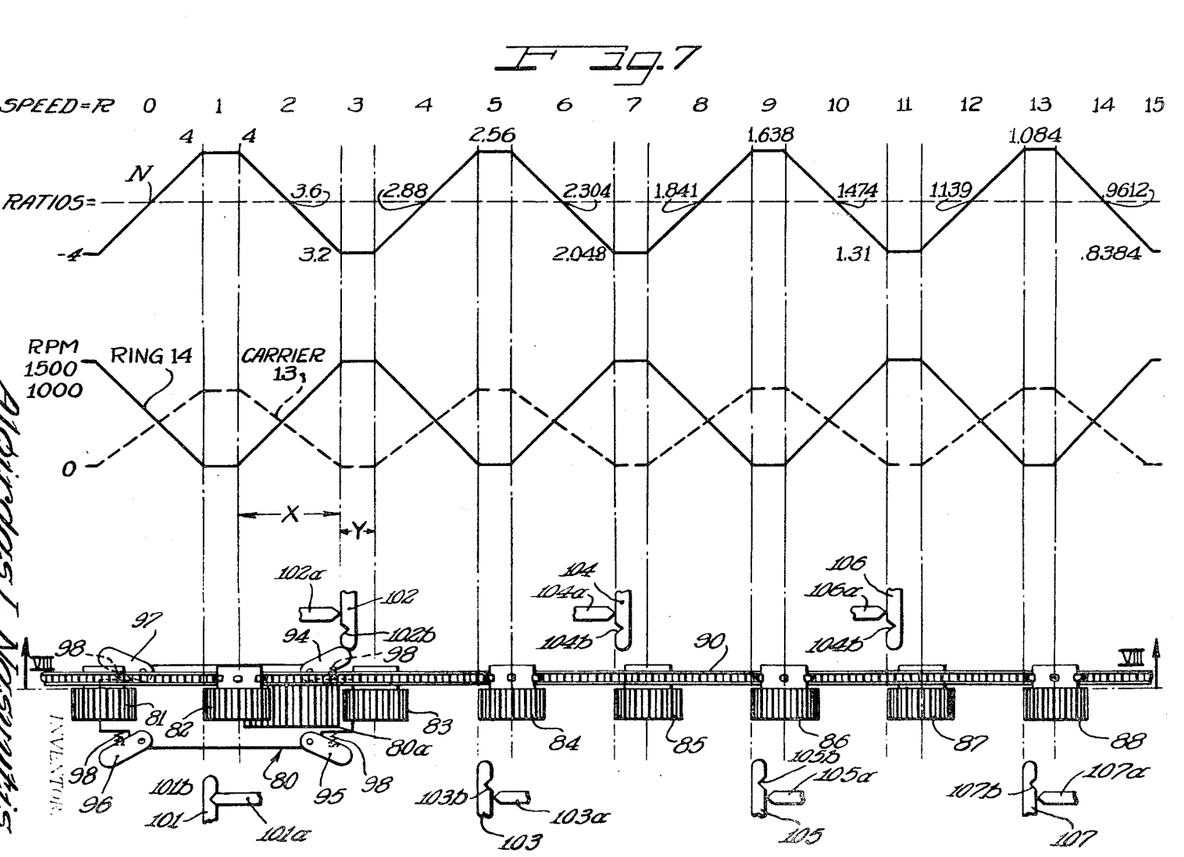
FIGURE 7 is a combined gear shift chart and diagrammatic illustration of a sequentially operable control system for the present invention.
Figure 9:
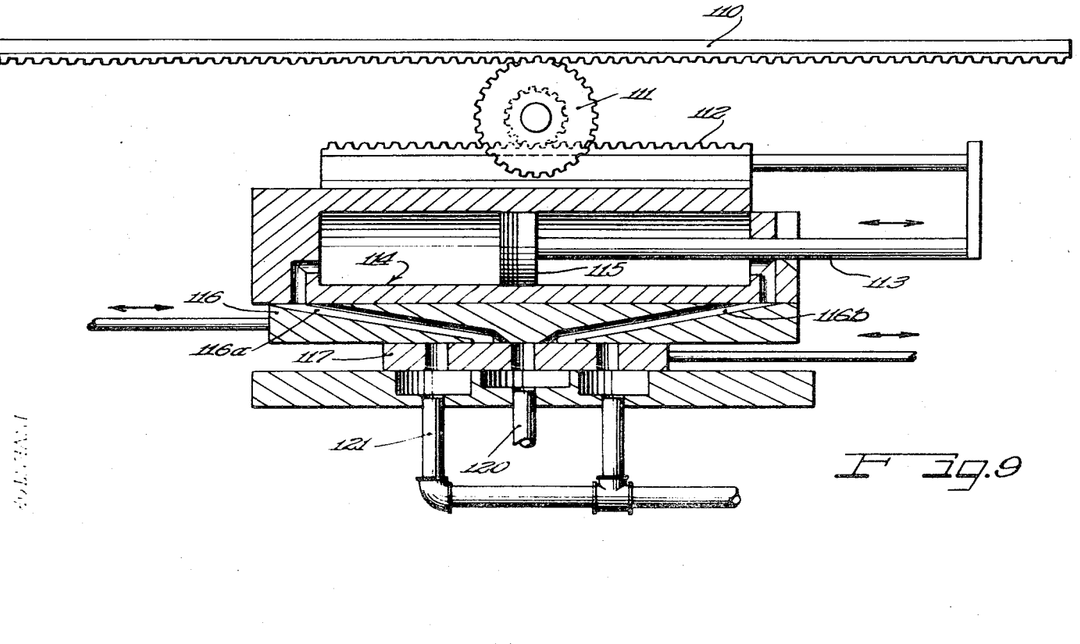
FIGURE 9 is a cross-sectional diagrammatic illustration of mechanical means for actuating the controls shown in FIGURES 7 and 8.

It will be appreciated that control of the transmission above described can be accomplished either manually or automatically by the manipulation of the carrier and ring brakes 53, 54 and the various clutch collars 36, 37, 46, 47 and 49 in the sequences set forth in the table above at page 9. Similarly, in the embodiments employing pumps and pump-motor combinations above described, control of these pumps by varying the displacement thereof or by controlling the control valves thereof in place of controlling the brakes 53, 54 will provide control. In FIGURES 7, 8 and 9 an automatic form of control particularly designed for use with variable displacement pump transmission embodiments such as shown in FIGURE 2, is illustrated.

As may be seen from a consideration of FIGURE 7, in the upper, chart portion thereof, a transmission having 15 forward speeds and reverse is considered. A maximum rotation of ring 14 is chosen at 1500 r.p.m. and, similarly, a maximum carrier rotation of 1,000 r.p.m. is provided through the choice of ring, carrier planet and sun diameter. Using the ratio steps mentioned in the specification at page 14, supra, and the gear shift sequence combinations discussed at page 9, it may be seen that the r.p.m. of the ring 14 alternates between a maximum of 1,500 r.p.m. and zero at the same time that the rotational velocity of the carrier 13 changes from zero to a maximum of 1,000 r.p.m. As a result of the gear shifts accomplished between cyclical alternations, the ratio of the transmission as a whole changes in accordance with the ratio numerals associated at the top of the chart. Change from maximum velocity of the ring to zero, and from zero velocity of the carrier to maximum, and vice versa, is accomplished in a linear distance $x$. During movement of a control member 80 through the distance $x$ it is necessary to vary the variable displacement pumps 63, 64 simultaneously and inversely from maximum displacement to minimum displacement. The controller 80 is arranged to accomplish this by way of an interrupted rack portion 80a which cooperates with a plurality of rotary gear members 81, 82, 83, 84, 85, 86, 87 and 88. The gears 81 through 88 are interconnected by way of a sprocket chain 90 which alternately passes above and below the respective gears as shown in FIGURE 8. With the arrangement shown in FIGURE 8, as any one of the gears 81 through 88 is rotated through 360° by the interrupted rack 80a the control 91 is rotated approximately 180° to manipulate the pumps 63 and 64 in opposite directions from full capacity to minimum capacity.

In the position of the parts shown in FIGURE 7, the controller 80 is shown between speeds 1 and 3 just prior to shifting of the transmission at speed 3. The rack 80a has moved toward the right rotating gear 82 counterclockwise as viewed in FIGURE 8 with a resultant clockwise rotation of the controller 91. Clockwise rotation of controller 91 operates, by a direct linkage, not shown, to increase the capacity of pump 63 and decrease capacity of pump 64 to thereby provide for stoppage of rotation of the carrier 13 and carrier countershaft 33 with the output of the transmission being determined by the rotational speed of the ring countershaft 43. With the carrier countershaft thus essentially stopped, continued movement toward the right, by the controller 80, will cause the projection 94 on the controller 80 to contact shifting button 102 to move upwardly forcing a shift to the carrier counershaft combination gears 31, 35 from countershaft combination 31, 34 by a suitable linkage. Detent 102a, or similar means, is spring biased against the button 102 for contact with the notch 102b when the button 102 is moved into its actuated position.

Any desired means may be employed for actuating the shift collars, as above noted, as well as for actuating the detents maintaining the gear combinations in meshed condition. A mechanical linkage may be employed or, alternatively, electrical switches energizing solenoids may be equally well employed. For example, the button 102 may, when moved upwardly, actuate a pair of switches energizing two solenoids, one moving shift collar 36 toward the left into engagement with gear 31 and the other moving shift collar 37 to the right into engagement with gear 35. Movement of button 102 simultaneously opens the switches controlled by any of buttons 104, 106 or releases their detents to thereby permit the shift to take place. Such actuator devices are well known and may take substantially any well known form, such as, for example, a solenoid actuated yoke normally biased into vertical position but moved to shifted position by switch energization.

As the controller 80 moves further toward the right, the rack portion 80a contacts gear 83, causing it to rotate in the counterclockwise direction which, in turn, causes movement of the controller 91 in the counterclockwise direction. Counterclockwise direction of rotation of the controller 91 will cause the displacement of the pump 64 to increase and the displacement of the pump 63 to decrease with a resultant decrease in speed of rotation of the ring 14 and an increase in speed of rotation of the carrier 13 until the ring has substantially stopped at which point the projection 95 on the controller 80 will contact shifting button 103. Actuation of the shifting button 103 will cause deenergization of button 101 and detent 101a and shifting of the ring gear countershaft gears to engage gears 42, 45. Continued movement of the controller 80 toward the right will progressively move, as can be observed, the gears 85, 86, 87 and 88 and cause gear shifts by way of corresponding shift actuators 104 and 106 on the carrier countershaft and 105, 107 on the ring countershaft.

Toward the end of movement of the actuator 80 toward the right as viewed in FIGURE 7, the last up shift of the transmission occurs with actuation of the ring countershaft button 107 which shifts the ring countershaft gears into the 41, 45 combination. Continued movement of the controller 80 toward the right causes rotation of gear 88 which controls the pump 63, 64 to vary the transmission output through stages 14 and 15. Retrograde movement of the controller down shifts the transmission. Initial retrograde movement of the controller 80 causes counter-rotation of the gear 88 bringing the transmission back to speed 13. At this point, projection 96 on the controller 80 contacts button 105 shifting the ring countershaft gears to the 41, 44 combination from the 41, 45 combination. Continued leftward movement of the controller 80 causes rotation of the gear 87 to bring the parts in a condition in which the ring is at full rotation and the carrier 13 is essentially stopped, namely, at position 11 and brings the projection 97 into contact with button 104 causing a shift in the transmission ratios on the carrier countershaft to the 32, 34 combination from the 32, 35 combination. As above described, actuation of the button 104 will simultaneously release button 106 and its switch or linkage connection with the means for providing the previously engaged gear combination 32, 35. Continued left-hand movement of the controller 80 will down shift the transmission to the neutral condition in which the carrier countershaft combination is gears 31, 34 and the ring gear countershaft combination is 48, 42 and in which the gear 81 has been turned partially to its mid-point position. Continued movement of the controller 80 to the left will cause, by rotation of the gear 81, substantially complete stoppage of the carrier 13 with resultant reverse gear positioning.

In considering the projections 94, 95, 96 and 97, it will be observed that it is desired that they actuate the respective buttons 101 through 107 only at the time when the given projection is at the leading edge of controller movement. This may be accomplished by providing springs 98 and pivoting the respective projections 94 through 97 such that, for example, projection 97 will swing inwardly as the controller 80 moves toward the right and projections 94, 95 will swing inwardly, without actuating buttons, as the controller 80 moves toward the left. Such an arrangement is necessary to prevent actuation of the buttons out of sequence. Similarly, it will be observed that the length of the controller 80 is slightly in excess of the distance between two adjacent countershaft control buttons, for example, buttons 101 and 103, to assure the proper interrelationship of the controller with the buttons on the return motion. This will be understood, for example, by considering the controller in the far right-hand position in which button 106 has previously been actuated, and is the controlling gear combination on the carrier countershaft 33 and 107 has been previously actuated and is controlling the gear combination on ring countershaft 43. If the controller 80 were the same length as, or slightly less in length than, the distance between pins 105, 107, its first actuation upon left-hand movement would be the carrier countershaft controlling pin 106 which should not be actuated until after the first ring countershaft shift. The first ring countershaft shift is accomplished by actuation of pin 105 which releases previously energized pin 107, an arrangement which is accomplished by providing the controller 80 of a length greater than the distance between pins 105, 107, thereby assuring that pin 106 is not actuated on the retrograde movement except by release upon actuation of pin 104.

The controller 80 may be moved by a manual linkage, if desired. It will be apparent, however, that in view of the continuous linear character of motion of the controller 80, that it may readily be manipulated and controlled automatically. An example of such an arrangement is shown in FIGURE 9 where a rack 110 may be connected to controller 80 so that movement of the rack 110 toward the right will cause movement of the controller 80 toward the right as viewed in FIGURE 7, and, similarly, movement of the rack 110 toward the left in FIGURE 9, will cause movement of the controller 80 toward the left as viewed in FIGURE 7. To permit a short stroke controller action, a reduction gear 111 is provided between rack 110 and control actuating rack 112 which is directly connected by means of a piston rod 113 with a piston 115. The piston 115 is under the control of a pair of hydraulic valves 116, 117 which direct fluid under pressure from conduit 120 to the cylinder 114 and thence to the sump 121. Valve 116 may be directly connected to a vehicle throttle or accelerator pedal, not shown, while the valve 117 may be connected to a speed-responsive device such as, for example, a mechanical fly-ball governor, or the like. With this arrangement, if the engine, to which the governor is attached, begins to rotate faster, the valve 117 will move toward the right tending to direct pressure from inlet 120 to the right side of cylinder 114 via valve conduit 116b, tending to move the piston 115 toward the left to up shift the transmission and thereby provide more direct engine engagement. Similarly, movement of the driver to depress the accelerator and, hence, obtain more engine power, will cause movement of the valve 116 toward the right tending to decrease the flow of fluid under pressure through port 116b and connect the lefthand side of cylinder 114 to the source of pressure 120 via port 116a and, accordingly, tending to move the controller 80 to the left and increase the gear ratio. As a result of this interrelationship, an automobile employing the transmission of the present invention and utilizing the throttle and governor control above described, can move at various speeds with a substantially constant preselected motor speed, the ratio in the transmission changing to accommodate the power requirements. As a result of the relationship described, the automobile will travel at a preselected speed determined by the driver in which the engine is neither accelerating nor decelerating and has the lowest possible engine r.p.m. If the driver desires to stop the car by removing his foot from the gas pedal, initially the control will select the lowest permissible ratio of gearing, in which the controller 80 is toward the right-hand end of the range, due to movement of the valve 116 toward the left with release of the gas pedal. This causes the engine to rotate at the lowest possible engine r.p.m. As the automobile slows down from decrease in the gasoline supply from the accelerator or by the application of brakes, the ratio of the transmission will increase to maintain the minimum speed of the engine. The system thus gravitates to a condition at which the engine is idling with the controller 80 moved toward the left to its zero or neutral condition. If, upon again desiring to proceed, the driver pushes on the gas pedal, the engine will automatically increase to its highest speed selected by the gas pedal and valve 116 and the ratio will automatically decrease as the governor valve 117 moves, in order to maintain the initially assumed engine r.p.m. with the governor valve 117 providing, in effect, a feed-back control causing the controller to assume the lowest ratio at which the engine will maintain its desired r.p.m. enforced by the accelerator pedal.

From the above description and drawings, it will be appreciated that I have provided a full power shift variable speed transmission capable of providing an infinite variation of speed between its maximum and minimum design values. The transmission eliminates the necessity for hydraulic clutches or torque converters in the main power drive line. The efficiency of the transmission, on an over-all basis, is well in excess of 90% and is well adapted to use in vehicle drives, industrial drives, elevator hoists, generator drives, and in other torque transmission systems.

Those skilled in the art will observe that variation may be made in the illustrated embodiments of the invention without departing from the scope of the novel concepts thereof. For example, the hydraulic pump-motor components may be replaced by their well-known electrical equivalent motor-generator units or mechanical variable speed drives. Further, it will be understood that differential gears may be substituted for the planetary gears illustrated. Accordingly, it is my intent that the scope of the invention be limited solely by that of the hereinafter appended claims.

I claim as my invention:

1. In combination in a transmission, a planetary input sytem comprising a first drive input sun gear member, first planet carrier means carrying a first set of planet gear members and a first ring gear member of larger diameter than said sun gear, a planetary output system comprising a second drive output sun gear member, second planet carrier means carrying a second set of planet gear members and a second drive input ring gear member, connection means drivingly connecting said first and second planet carrier means, second separate parallel connection means drivingly connecting said first and second ring gear members, and means selectively operable to disconnect at least one of said connection means.

2. The transmission combination set forth in claim 1 wherein said input and output planet systems have the same gear ratios.

3. The transmission set forth in claim 2 wherein at least one of said connection means comprises a gear connection providing a ratio change.

4. The transmission construction set forth in claim 2 wherein both said connection means comprise gear connections providing ratio change.

5. The transmission construction set forth in claim 1 wherein both said connection means comprise gear connections, each providing a ratio change.

6. The transmission set forth in claim 1 wherein at least one of said connection means comprises a gear connection providing a ratio change.

7. The transmission set forth in claim 6 including shift means operable along a continuous unidirectional path to shift said transmission from neutral condition through its entire range of forward speeds and vice-versa.

8. The transmission set forth in claim 6 including shift means operable along a continuous unidirectional path to shift said transmission from its lowest ratio reverse speed through neutral through the forward speeds to its lowest ratio forward speed and vice-versa.

9. The transmission set forth in claim 6 including means substantially stopping rotation of one of said connected means, and means shifting said gear connection from one ratio to another while the connected members are rotationally substantially motionless.

10. The transmission set forth in claim 7 wherein said shifting means operates to change the over-all ratio of said transmission during the transfer of torque through said transmission.

11. In combination in a transmission, a planetary input system comprising a first drive input sun gear member, first planet carrier means carrying a first set of planet gear members and a first ring gear member, a planetary output system comprising a second drive output sun gear member, second planet carrier means carrying a second set of planet gear members and a second ring gear member, connection means drivingly connecting said first and second planet carrier means, and second connection means drivingly connecting said first and second ring gear members, both said connection means comprising gear connections each providing a ratio change, means selectively stopping rotation of said connected means individually, and means shifting the gear connections from one ratio to another while the respective connected members are rotationally substantially motionless and while at least one of said connections is transferring torque.

12. The transmission set forth in claim 11 in which the means for stopping rotation of one of said connected members comprises a brake connected to the connected means in said first planetary input system.

13. The transmission set forth in claim 11 wherein the means for substantially stopping rotation comprises motor means, operatively connected to at least one of the connected means in said first planetary input system for varying the speed thereof.

14. The transmission set forth in claim 13 wherein the motor means comprises two variable capacity motor-pump drives hydraulically connected in closed circuit series relation and drivingly connected respectively to the first ring member and first carrier member and having means simultaneously increasing the capacity of one motor-pump and decreasing the capacity of the other.

15. The transmission set forth in claim 13 wherein the motor means comprises a single reversible variable speed motor with control means for varying the speed and direction thereof, said motor being connected to both said first carrier and said first ring through a differential ring carrying differential gears drivingly connected to the said first carrier and first ring.

16. The transmission set forth in claim 13 wherein said motor means comprises first and second constant displacement pumps drivingly connected to the first carrier and first ring respectively, a third constant displacement pump driven by said first sun, and connected to said first and second pumps via variable two-way valves whereby said first and second pumps will vary the first carrier and first ring speeds relatively inversely from zero to maximum.

17. The transmission set forth in claim 13 wherein said motor means comprises three identical pumps connected respectively to said first carrier, said first ring and via two-to-one speed increase means to a differential ring carrying differential gears drivingly connected to said first carrier and first ring, and three-way valve means selectively proportioning circulation from the carrier and ring pumps to the differential ring pump.

18. The transmission set forth in claim 11 wherein said last-named means is responsive to the position of throttle means controlling the speed of said first sun member.

19. The transmission set forth in claim 11 wherein said last-named means is responsive to the position of throttle means controlling the speed of said first sun member, and also responsive to the speed of rotation of the said first sun member.

20. The transmission set forth in claim 11 wherein said shifting means is operable along a continuous unidirectional path to shift said transmission from neutral condition through its entire range of forward speeds and vice-versa.

21. The transmission set forth in claim 11 including shift means operable along a continuous unidirectional path to shift said transmission from its lowest ratio reverse speed through neutral through the forward speeds to its lowest ratio forward speed and vice-versa.

22. In combination in a transmission, a planetary input system comprising a first drive input sun gear member, first planet carrier means carrying a first set of planet gear members and a first ring gear member, a planetary output system comprising a second drive output sun gear member, second planet carrier means carrying a second set of planet gear members and a second ring gear member, said ring gear members being of larger diameter than their respective sun gear members, means providing two separate parallel output power paths from said input planetary system, further means recombining said paths in said output planetary system to their respective counterpart gears, and means selectively operable to interrupt at least one of said power paths.

23. In combination in a transmission, a planetary input system comprising a sun gear member, a first planet carrier member carrying a first set of planetary gears and a first ring gear member, a planetary output system comprising a second sun gear member, a second planet carrier member carrying a second set of planet gears and a second ring gear member, first and second connection means drivingly connecting two of said members of said planetary input system to two of said members of said planetary output system, both said connection means comprising gear connections each providing a shiftable ratio change, means selectively stopping rotation of said connection means individually, and means for shifting the gear ratios of the stopped connection means from one ratio to another while stopped even though the other of said connection means is transferring torque.

24. In combination in a transmission, a planetary input system comprising a first sun gear member, a first planet carrier member carrying a first set of planet gears and a first ring gear member, a planetary output system comprising a second sun gear member, a second planet carrier member carrying a second set of planet gears, and a second ring gear member, ratio change connection means drivingly connecting respective ones of said members of the planetary input system and planetary output system and second connection means drivingly connecting second respective members of said planetary input system and planetary output system, means selectively stopping rotation of said connection means individually, and means for changing the ratio of said stopped connection means while stopped even though the other of said connection means is transferring torque.

25. In combination in a transmission, a planetary input system comprising a first drive input sun gear member, first planet carrier means carrying a first set of planet gear members and a first ring gear member, a planetary output system comprising a second drive output sun member, second planet carrier means carrying a second set of planet gear members and a second ring gear member, connection means drivingly connecting said first and second planet carrier means, second connection means drivingly connecting said first and second ring gear members, and an annular differential ring, differential gear means carried by said differential ring and drivingly interconnecting said first planet carrier means and said first ring gear member, first brake means for stopping rotation of said first planet carrier means, second brake means for stopping rotation of said first ring gear member, and third brake means for stopping rotation of said differential ring.

26. The transmission set forth in claim 11 wherein sequentially increasing ratio gear connections are provided alternately by said first and second connection means.

27. The transmission set forth in claim 22 including gear ratio change means in each of said paths.

28. The transmission set forth in claim 22 including gear ratio change means in each of said paths, means stopping said paths alternately and shifting the gear ratio change means to thereby provide sequentially increasing ratios through alternate paths.

References Cited

UNITED STATES PATENTS

| | | | |
|---|---|---|---|
| 3,334,527 | 8/1967 | Carnegie | 74—682 X |
| 934,716 | 9/1909 | Dodd | 74—682 |
| 1,814,096 | 7/1931 | Saki | 74—765 |
| 2,962,915 | 12/1960 | Wiggermann | 74—687 |
| 2,990,727 | 7/1961 | Miller | 74—705 X |
| 3,079,813 | 3/1963 | Quigley | 74—682 X |
| 3,106,107 | 10/1963 | Hardy | 74—765 X |
| 3,203,276 | 8/1965 | Bullard | 74—687 |
| 3,204,486 | 9/1965 | DeLalio | 74—687 |
| 3,212,358 | 10/1965 | DeLalio | 74—687 |
| 3,364,790 | 1/1968 | Asper et al. | 74—687 |

FOREIGN PATENTS

| | | |
|---|---|---|
| 1,334,021 | 6/1963 | France. |
| 897,621 | 5/1944 | France. |

WILLIAM L. FREEH, Primary Examiner

T. C. PERRY, Assistant Examiner

U.S. Cl. X.R.

74—764